United States Patent [19]
Griffin et al.

[11] 3,905,874
[45] Sept. 16, 1975

[54] FRACTIONATOR COLUMN CONTROL SYSTEM

[75] Inventors: Donald E. Griffin; Byron T. Brown, both of Bartlesville, Okla.; William H. Williams, Paducah, Ky.

[73] Assignee: Phillips Petroleum Company, Bartlesville, Okla.

[22] Filed: Aug. 14, 1972

[21] Appl. No.: 280,536

[52] U.S. Cl. ........ 203/1; 203/DIG. 18; 208/DIG. 1; 196/132; 235/151.12
[51] Int. Cl.² .......................................... B01D 3/42
[58] Field of Search ............. 203/1, 2, 99, DIG. 18; 202/160, 206; 196/132; 208/DIG. 1; 235/151.12

[56] References Cited
UNITED STATES PATENTS

| | | | |
|---|---|---|---|
| 3,143,643 | 8/1964 | Fluegel et al. | 203/2 |
| 3,150,064 | 9/1964 | Dobson | 202/206 |
| 3,249,519 | 5/1966 | Cabbage | 203/2 |
| 3,296,097 | 1/1967 | Lupfer | 203/2 |
| 3,359,185 | 12/1967 | Matta | 202/206 |
| 3,401,092 | 9/1968 | Matta | 202/206 |
| 3,420,748 | 1/1969 | Johnson et al. | 203/1 |
| 3,428,528 | 2/1969 | Oglesby et al. | 196/132 |
| 3,449,215 | 6/1969 | Johnson et al. | 196/132 |
| 3,503,854 | 3/1970 | Good | 202/206 |
| 3,600,282 | 8/1971 | Lupfer et al. | 235/151.12 |
| 3,748,448 | 7/1973 | Sayles et al. | 235/151.12 |

FOREIGN PATENTS OR APPLICATIONS

| | | | |
|---|---|---|---|
| 313,547 | 10/1971 | U.S.S.R. | 196/132 |
| 266,729 | 7/1970 | U.S.S.R. | 203/1 |

*Primary Examiner*—Jack Sofer
*Assistant Examiner*—Frank Sever
*Attorney, Agent, or Firm*—Neuman, Williams, Anderson & Olson

[57] ABSTRACT

A system for controlling the operation of a petroleum fractionator column is disclosed wherein two control loops are used to maintain the liquid level at the fractionator bottom and the rate of liquid flow onto an intermediate tray at desired levels through adjustment of the rate at which slurry is recycled to the fractionator and the rate at which light cycle oil is withdrawn from an intermediate point in the column. The system may include means for reducing the interaction between the two control loops and means for altering the operation of the control loops to compensate for transient conditions in the fractionator following an alteration in the feed rate. Means are also provided for indirectly calculating the rate of fluid flow onto the intermediate tray.

4 Claims, 3 Drawing Figures

3,905,874

FRACTIONATOR COLUMN CONTROL SYSTEM

BACKGROUND OF THE INVENTION

This invention relates to methods and apparatus for controlling the operation of fractionator columns, and, in particular, relates to systems for controlling the operation of fractionators used for separating cracked petroleum into its various component parts.

The modern petroleum refinery contains a great number of processing units with the operation of any one such unit being heavily dependent on the operation of the other units. Thus, any single refinery might include a main reactor or catalytic cracker for breaking the petroleum feed stock into various components, a catalyst regenerator operating in conjunction with that cracker, a main fractionator for separating the cracked products, extractors, absorbers, strippers, dryers, and so forth. Each unit may be envisioned as receiving one or more input or feed streams and operating on those input streams in some manner to produce one or more output streams. Each unit may include one or more adjustable elements or control parameters for altering the processing performed by that unit on the feed streams in order to alter the nature of the output stream. Moreover, each unit may have various operational parameters which must be maintained within some limits in order for that unit to function properly. Such parameters might include the temperature of the material within the unit or the flow rates of either the input or output streams. Thus, when one or more parameters of an input stream to any individual unit are altered, it may be desirable to alter the control parameters of that unit to maintain its operational parameters within desired limits or to alter the nature of the output stream in some desired manner. Further, even when the input feed streams to a unit are maintained in a relatively steady state condition, it is often desirable to alter the control parameters of that unit in response to any anamolous variation in the unit's operational parameters.

This invention relates particularly to the control of fractionator columns useful in petroleum refineries. Such fractionator columns are subject to two particular limits on their operational parameters which are of interest here. First, the rate of liquid flow onto a tray in the fractionator column from which an output stream is drawn must be maintained at a desired level. If the flow rate is too high, the tray will overflow or flood, preventing proper operation of the fractionator. If the flow rate is too low, the tray will dry up and the rate of flow of the output stream will fall to zero. Second, the liquid level at the bottom of the fractionator column must be maintained relatively constant. Alterations in the bottom level tend to alter the chemical composition of the column output stream or streams. As a complicating feature, these two parameters are not normally totally independent so that, for example, an alteration of the liquid bottom level may affect the liquid flow rate onto a tray. As another complicating feature, changes in the rate of flow of the input feed stream may not cause linearly related, proportionate changes in the output feed streams at least during short, transient periods after an input feed stream rate change.

Many fractionator control systems have been proposed in the past. These prior systems have, however, had various deficiencies associated therewith. In particular, the previously proposed control systems have been incapable of maintaining both the liquid flow rate onto a column tray and the liquid level at the fractionator bottom at desired values. They have not adequately accounted for the interdependence of liquid bottom level and tray liquid flow rate. Moreover, they have not recognized or accounted for the transient conditions which may exist in a fractionator column for a short time after a change in the rate of flow of the input feed stream.

SUMMARY OF THE INVENTION

This invention provides methods and apparatus for controlling the operation of fractionator columns wherein the rate of liquid flow onto a tray disposed at a first intermediate location in the controlled column and the liquid level at the bottom of the column are controlled by alteration of the rate at which the column bottom product is recycled to the column and the rate at which liquid is withdrawn from a tray disposed at a second intermediate location in said column. Means may be provided to account for the interrelationship of changes in the bottom liquid level and the rate of liquid flow onto the first intermediate tray. Further, means may be provided to account for the transient alterations in the bottom liquid level and the liquid available at the second intermediate tray which occur for short periods after changes in the input feed stream rate of flow.

Thus, it is an object of this invention to provide a system for controlling the operation of fractionator columns.

It is an object of this invention to provide a control system for fractionators wherein the liquid level at the fractionator bottom and the rate of liquid flow onto an intermediate tray are maintained at desired values by controlling the rate at which fluid from an intermediate tray is withdrawn from the fractionator and the rate at which the fractionator bottom product is recycled to the column.

It is an object of this invention to provide a control system for fractionator columns wherein the liquid level at the fractionator bottom and the rate of liquid flow onto an intermediate tray are maintained at desired values and means are provided to account for the interaction between relative changes in the two levels thus controlled.

It is an object of this invention to provide a control system for fractionators wherein the liquid level at the fractionator bottom and the rate of liquid flow onto an intermediate tray are maintained at desired values, which system recognizes and provides means to account for the transient variations in the two levels thus controlled which occur upon a change in the rate of flow of an input feed stream.

Further and additional objects and advantages of this invention will be apparent from the description, accompanying drawing, and appended claims.

DESCRIPTION OF THE PREFERRED EMBODIMENT

A preferred embodiment of this invention will be described with reference to a particular petroleum fractionator column shown in diagrammatic form in FIG. 1. As will be obvious to those skilled in the art, this invention may be applied to many types of fractionator columns other than that shown in FIG. 1.

Figure 1:
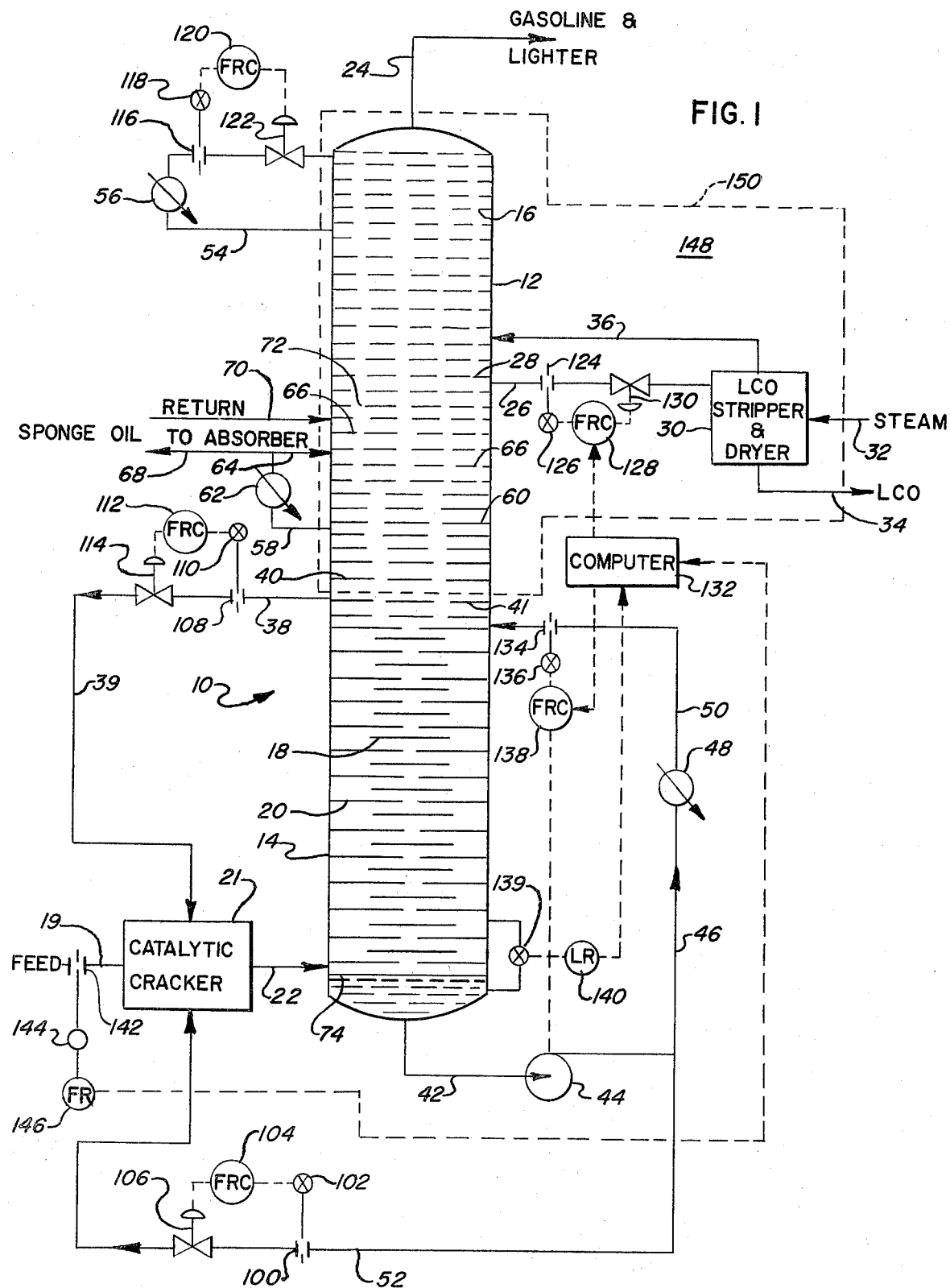
FIG. 1 is a drawing, in schematic and block form, of a fractionator column including a control system of this invention.

The fractionator column 10 of FIG. 1 is comprised of two sections, an upper or fractionation section 12 and a lower or heat transfer section 14. The fractionation section 12 is composed of a plurality of bubble cap trays indicated diagrammatically by the horizontal dashed lines as at 16. Each tray has associated therewith appropriate wiers and downcomers. The heat transfer section 14 is composed of alternate disc and donut trays indicated as at 18 and 20, respectively. The disc trays 18 are in the shape of flat, circular discs oriented horizontally, while donut trays 20 are of a flat, annular configuration and are also oriented horizontally. The relative dimensions of the disc and donut trays are such that the disc trays 18 and the openings formed by the donut trays 20 are in overlapping relationship when viewed in the vertical direction, as shown in FIG. 1.

A feed stream of petroleum from a source is introduced through a conduit 19 into a catalytic cracker reactor 21 and thence through a conduit 22 into the bottom of fractionator 10. Four conduits are provided for withdrawing products from the fractionator. A top product comprising gasoline and lighter fractions is withdrawn through conduit 24 at the upper level of fractionator 10. A light cycle oil (LCO) is withdrawn through conduit 26 from a tray 28 located at a position in the column intermediate the top and bottom trays. The light cycle oil in conduit 26 is sent to a stripping and drying unit 30. Steam is supplied to stripper and drier 30 through conduit 32. The stripped and dried light cycle oil is removed from the stripper and dryer through conduit 34, while the remainder of the output product of the stripper and dryer is reintroduced into the fractionator 10 through conduit 36 at a level above that of tray 28.

A heavy cycle oil (HCO) is withdrawn through conduit 38 from a tray 40 also located at a position in the column intermediate the top and bottom trays, but below the level of tray 28. If desired, all of the heavy cycle oil removed from tray 40 may be returned to the catalytic cracker 21 through conduit 39 for further conversion into lighter fractions. A tray 41 is disposed immediately subjacent tray 40. A bottom product or slurry, comprising the heaviest fractions of the input feed stream and the catalyst particles or "fines" included in the input feed stream, is withdrawn from the fractionator bottom through a conduit 42. The slurry is passed through a pump and then split into two streams. One stream passes through a conduit 46, a cooler 48, and a conduit 50 to be returned to fractionator 10 at the upper extremity of heat transfer section 14. The other slurry stream is returned to the catalytic cracker 21 through conduit 52. Thus, the entire bottom product of fractionator 10 is recycled, part of it being recycled to the fractionator and part of it being recycled to the catalytic cracker. Cooler 48 operates to remove heat from that part of the slurry recycled to the fractionator. As will be apparent, if the input feed through conduit 22 is held at a constant temperature and flow rate, varying the amount of slurry which is recycled to fractionator 10 through cooler 48 will alter the net amount of heat added to lower portion 14 of the fractionator 10, and will thus vary the amount of material which is condensed within fractionator 10. In fractionators of slightly more conventional form than that shown in FIG. 1, a slurry reboiler may be used in place of cooler 48. However, some type of heat transfer unit must be located in conduit 46. Varying the rate at which slurry is recycled to fractionator 10 through cooler 48 has the same effect as varying the amount of slurry or bottom product which is recycled to a fractionator column through a slurry reboiler.

The fractionator 10 is provided with a conduit 54 for removing liquid from one of the upper bubble cap trays in fractionation section 12. The fluid in conduit 54 is condensed in a cooler 56 and added as reflux fluid at the top of the fractionator. A conduit 58 is provided for removing a side reflux stream from bubble cap tray 60 located between trays 28 and 40. The side reflux is passed through a cooler 62, part of this reflux being returned to fractionator 10 through conduit 64 to a bubble cap tray 66 located between trays 28 and 60. The remaining portion of the side reflux from cooler 62 is passed through a conduit 68 to an absorber where it is used as sponge oil. The sponge oil is then returned through a conduit 70 to a bubble cap tray 72 located above tray 60. The composition of the sponge oil returning to the fractionator through conduit 70 will be altered from that of the stream leaving the fractionator through conduit 68 because of the nature of the process carried out in the absorber.

As thus far described, fractionator column 10 is of conventional construction and operation. It operates in the conventional manner. Thus, fractionator 10 is operated at suitable conditions to separate the lightest components, i.e., gasoline and lighter products, a light cycle oil, and a heavy cycle oil with the heavier components collecting in the bottom of the fractionator to form a slurry and establishing a liquid level 74. The details of the operation of the fractionator 10 and its associated components will be readily apparent to those skilled in the art and need not be further explained here.

Turning now to the control system associated with the operation of fractionator 10, apparatus is provided for maintaining a number of the operational parameters of the fractionator at relatively constant values. The combination of an orifice flow rate meter 100 for measuring the rate of fluid flow in conduit 52, a transducer 102 for converting the output of orifice meter 100 to a form capable of use by a flow recorder-controller 104, flow recorder-controller 104 for determining the difference between the flow rate through conduit 52 and a desired or set point value for the flow through that conduit, and a valve 106 for adjusting the flow rate through conduit 52 in response to that determined difference is provided for maintaining the rate of slurry recirculation to the catalytic cracker through conduit 52 at a relatively constant level. Flow recorder-controller 104, as well as the other flow recorder-controllers mentioned hereinafter, may additionally provide a graphic record of the flow rate through conduit 52. The combination of an orifice flow rate meter 108, a transducer 110, a flow recorder-controller 112, and a valve 114 similarly maintains the rate at which heavy cycle oil is returned to the catalytic cracker through conduit 38 relatively constant. An orifice meter 116, a transducer 118, a flow recorder-controller 120, and a valve 122 maintain the rate at which reflux is circulated through cooler 56 at a relatively constant level. The rates at which fluid flows through conduits 38 and 52 to the catalytic cracker and the rate at which the feed stream enters fractionator 10 through conduit 22 are determined in the fractionator of FIG. 1 by the operational parameters of the catalytic cracker associated therewith. Further, those rates may be controlled in accord with the means for optimizing the operation of a catalytic cracking unit disclosed in the application of Donald E. Griffin entitled "Process Unit Control System," filed concurrently herewith and assigned Ser. No. 280,535, now U.S. Pat. No. 3,828,171. The rate at which top reflux flows through cooler 56 is relatively independent of the other operational parameters of the fractionator 10.

The control system of this invention further comprises an orifice meter 124, a transducer 126, a flow recorder-controller 128, and a valve 130 associated with conduit 26 to maintain the flow of light cycle oil through that conduit at a set point value determined by a computer network 132 in accord with the principles of this invention. Conduit 50 has associated therewith an orifice meter 134 for measuring the rate at which slurry is recycled through cooler 48 to fractionator 10, a transducer 136 for converting the output of orifice meter 134 to a form usable by a flow recorder-controller 138, and a flow recorder-controller 138 for maintaining the rate of fluid flow through conduit 50 at a set point value. Flow recorder-controller 138 is operative to control the speed of operation of pump 44. Since the rate of flow through conduit 52 is relatively fixed, as previously explained, altering the speed of operation of pump 44 alters the rate of fluid flow through conduits 46 and 50. The set point of flow recorder-controller 138 is determined by computer network 132 in accord with this invention. Flow recorder-controller 138 may additionally provide a graphic record of the flow rate through conduit 50. There is additionally provided a differential pressure transducer 139 and a level recorder 140 for developing an electrical signal indicative of the height of the liquid level 74 in the bottom of fractionator column 10, which signal is applied to computer network 132. Finally, an orifice meter 142 is interposed in conduit 19 for measuring the rate at which fresh feed is supplied to catalytic cracker 21 and, thus, to fractionator 10. A transducer 144 converts the output of orifice meter 142 into a form suitable for use by a flow recorder 146. A signal indicative of that flow rate is also supplied to computer network 132.

Computer network 132 is operative to establish the set points applied to flow recorder-controllers 128 and 138. It thus controls the rate at which light cycle oil is withdrawn from fractionator column 10 through conduit 26 and the rate at which slurry is recycled through cooler 48 to fractionator column 10. The two set points are set as the result of two measurements, the liquid level at the fractionator bottom and the rate at which liquid flows down the tower onto tray 40.

The computer network 132 may be of either the analog or digital variety or a combination of both. In the embodiment of the invention described herein, a digital computer is used. However, a number of ways in which the described control system could be constructed using analog computation techniques will be obvious to those skilled in the art.

According to one control system of this invention, the rate at which light cycle oil is withdrawn through conduit 26 is controlled in accord with the liquid level 74 at the fractionator bottom and the rate at which slurry is recycled to the fractionator 10 is controlled in accord with the rate at which fluid flows down the fractionator onto tray 40. The set point inputs to flow recorder-controllers 128 and 138 are set according to the following algorithms, respectively:

(1) $LCOSP_N = LCOK_P(BLLE_N - BLLE_{N-1}) + LCOK_I BLLE_N + LCOSP_{N-1}$ (2) $SLUSP_N = SLUK_P(TFRE_N - TFRE_{N-1}) + SLUK_I TFRE_N + SLUSP_{N-1}$

The subscript N is a positive integer number relating to time and indicates that the value of the subscripted quantities is taken at the sample time represented by N. The quantities in the algorithm have the following definitions:

$LCOSP_N$ = the set point applied to controller 128 at time interval N in units of barrels per hour;

$LCOSP_{N-1}$ = the set point applied to controller 128 at time interval N−1 in units of barrels per hour;

$BLLE_N$ = the error or deviation of the fractionator bottom liquid level from the desired level at time interval N in units of inches;

$BLLE_{N-1}$ = the error or deviation of the fractionator bottom liquid level at time interval N−1 in units of inches;

$LCOK_P$ = a proportional constant;

$LCOK_I$ = an integral constant;

$SLUSP_N$ = the set point applied to controller 138 at time interval N in units of barrels per hour;

$SLUSP_{N-1}$ = the set point applied to controller 138 at time interval N−1 in units of barrels per hour;

$TFRE_N$ = the error or deviation of the flow of liquid onto tray 40 from the desired level at time N in units of barrels per hour;

$TFRE_{N-1}$ = the error or deviation of the flow of liquid onto tray 40 from the desired level at time N−1 in units of barrels per hour;

$SLUK_P$ = a proportional constant; and $SLUK_I$ = an integral constant

The proportional and integral constants for both algorithms are determined experimentally and will vary depending on the nature of the fractionator 10 which is being controlled. In one application of this invention, the time interval used between successive sampling times N and N+1 was 5 minutes, $LCOK_P$ was set to 10, $LCOK_I$ was set to 4, $SLUK_P$ was set to 0.3, and $SLUK_I$ was set to 0.4. It will thus be apparent that two control loops are used to control the operation of fractionator 10, the bottom liquid level is maintained at the desired value by control of the light cycle oil draw-off rate and the rate of liquid flow onto tray 40 is maintained at the desired value by control of the rate at which slurry is recycled to the fractionator.

However, it will also be apparent that there is some interaction between the control loops. Altering the rate of light cycle oil draw will also have some effect on the rate of liquid flow onto tray 40, while altering the rate of slurry recycling to the fractionator will also have some effect on the fractionator bottom liquid level. Thus it is desirable to include a decoupling correction to reduce or remove the interaction between the two control loops. Decoupling equations may be used to alter the controller set points as determined by equations (1) and (2) above. One such set of equations useful in the control system of this invention is:

(3) $\Delta LCOSP_N = K_1 SLUSP_N + K_1 \Delta SLULP_N$
(4) $\Delta SLUSP_N = K_2 LCOSP_N + K_2 \Delta LCOSP_N$.

The quantities included in equations (3) and (4) are defined as follows:

$\Delta LCOSP_N$ = the change made in the set point calculated from equation (1) applied to controller 128 at time interval N to achieve decoupling;

$\Delta SLUSP_N$ = the change made in the set point calculated from equation (2) applied to controller 138 at time interval N to achieve decoupling;

$K_1$ = a constant; and
$K_2$ = a constant.

The quantities $LCOSP_N$ and $SLUSP_N$ are defined as given above with relation to equations (1) and (2).

Equations (3) and (4) may be solved to obtain:

(5) $\quad \Delta LCOSP_N = \dfrac{K_1 (SLUSP_N + K_2 LCOSP_N)}{1 - K_1 K_2}$ (6) $\quad \Delta SLUSP_N = \dfrac{K_2 (LCOSP_N + K_1 SLUSP_N)}{1 - K_1 K_2}$ Constants $K_1$ and $K_2$ must also be experimentally determined or estimated. In the previously mentioned one application of this invention, $K_1$ was set to 0.2 and $K_2$ was set to −4.5.

In the operation of a fractionator such as shown in FIG. 1, a change in the rate at which feed is supplied through conduit 22 will normally result in an approximately proportionate change in the rate of flow of the output streams after a steady state condition is reestablished. However, immediately after such a change in feed flow rate, a transient condition may result in the operational characteristics of the fractionator column. Thus, if the feed rate is increased, the fractionator bottom liquid level initially decreases due to the increase in the rate at which heat is supplied to the fractionator, and then gradually increases due to the increase in the rate at which mass is flowing into the fractionator. Therefore, to hold the bottom liquid level constant, the rate at which light cycle oil is withdrawn through conduit 26 must be initially decreased and then increased to a new value.

The control system of this invention may include means for minimizing the variation in the fractionator bottom liquid level caused by the transient conditions occurring after a change in the feed flow rate by predicting the alteration in the set point applied to controller 128 which must be made to adjust the light cycle oil draw-off rate to maintain the bottom liquid level constant. An equation for making this prediction is:

(5) $\quad \Delta LCOSP_N = K_3 \sum_{I=N}^{N-7} P(I) E(N-I)$

The quantities included in equation (5) are defined as follows:

$\Delta LCOSP_N$ = the change made in the set point calculated from equation (1) applied to controller 128 at time interval N to predict the required change in light cycle oil draw-off rate to maintain the fractionator bottom liquid level constant;

$P(I)$ = the predicted steady state change in light cycle oil draw-off rate to maintain the fractionator bottom liquid level constant, in spite of variations in input feed flow occurring at time interval I;

$E(N-I)$ = an effectiveness vector for combining the values of $P(I)$ calculated for the time interval N and the seven preceding time intervals to N−7; and $K_3$ = a constant For many fractionator columns, as previously stated, the relationship between changes in fresh feed rate and changes in light cycle oil draw-off rate required to return the fractionator bottom liquid level to its original state after the column has passed through the period of transient operation and returned to a relatively steady state condition may be assumed to be approximately proportional. Thus, $P(I)$ may be determined as follows:

(6) $\quad P(I) = (FFR_I - FFR_{I-1}) \dfrac{LCO_{I-1}}{FFR_{I-1}}$

The quantities included in equation (6) are defined as follows:

$FFR_I$ = the rate at which fresh feed is supplied to the fractionator 10 through conduit 22 at time interval I;

$FFR_{I-1}$ = the rate at which fresh feed is supplied to the fractionator 10 through conduit 22 at time interval I−1; and $LCO_{I-1}$ = the rate at which light cycle oil is withdrawn from fractionator 10 through conduit 26 at time interval I−1.

It will thus be apparent that the operation of equation (5) above is effective to combine two vectors. The first vector $P(I)$ is a prediction of the required steady state change in light cycle draw-off rate. The second vector $E(I)$ is an effectiveness vector which, for any time interval N, gives predetermined weights to the values of $P(I)$ determined for time interval N and certain preceding time intervals. In equation (6), values of $P(I)$ for interval N and the seven preceding intervals to N−7 are combined. In the above-mentioned one application of this invention, $K_3$ was set equal to 1 and $E(0)$ through $E(7)$ were set as follows:

$E(0) = -0.5$;
$E(1) = +0.4$;
$E(2) = +0.3$;
$E(3) = +0.2$;
$E(4) = +0.2$;
$E(5) = +0.2$;
$E(6) = +0.1$; and
$E(7) = +0.1$ In the control system as thus far described, it has been assumed that the rate of liquid flow onto tray 40 was a known quantity. In many fractionator columns, it is not possible or is very difficult to obtain a direct measure of the rate of fluid flow onto an individual tray. However, and in accord with the principles of this invention, it is possible to determine that rate by making a heat and material flow balance using a control volume including the portion of the fractionator column above the tray of interest. In particular, in the control system described with reference to FIG. 1 herein, a heat and material balance may be taken using the control volume 148 indicated as being enclosed within dashed line 150 and including tray 40. At equilibrium, the rate of fluid flow onto tray 40 is approximately equal to the rate of fluid flow off of tray 40. The balance equation used to calculate the fluid flow off of tray 40 is as follows:

(7) $H41STM + HSTM + HABS + Wxh41 = HTP + HLCO + QTOP + QSIDE + HSO + Wxh40$.

The quantities used in equation (7) are defined as follows:

H41STM = the total enthalpy of the steam vapor passing from tray 41 to tray 40 in units of British thermal units (BTU) per hour (Steam is normally included in the feed introduced through conduit 22.);

HSTM = the total enthalpy of the steam entering LCO stripper and dryer 30 through conduit 32 in units of BTU per hour;

HABS = the total enthalpy of the hydrocarbon absorbed in the sponge oil leaving the fractionator through conduit 68 and returning through conduit 70 in units of BTU per hour;

HTP = the total enthalpy of the top product leaving the fractionator as vapor through conduit 24 in units of BTU per hour;

HLCO = the total enthalpy of the light cycle oil removed through conduit 34 in units of BTU per hour;

QTOP = the heat removed from the fractionator by the top reflux cooler 56 in units of BTU per hour;

QSIDE = the heat removed from the fractionator by the side reflux cooler 62 in units of BTU per hour;

HSO = the decrease in the total enthalpy of the sponge oil leaving the fractionator through conduit 68 and returning through conduit 70 in units of BTU per hour;

$h41$ = the specific enthalpy of the hydrocarbon vapor passing from tray 41 to tray 40 in units of BTU per pound;

$h40$ = the specific enthalpy of the liquid flowing from tray 40 in units of BTU per pound; and W = the rate of fluid flow from tray 40 in units of pounds per hour.

Equation (7) may be solved to yield the flow of fluid from tray 40 as follows:

(8) $W = (H41STM + HSTM + HABS - HTP - HLCO - QTOP - QSIDE - HSO)/(h41 + h40)$

As will be apparent to those skilled in the art, various sensors must be disposed about the fractionator of FIG. 1 to determine the quantities required to solve equation (8) for W. The value for W thus determined is used as an approximation of the rate of liquid flow onto tray 40.

Figure 2A:
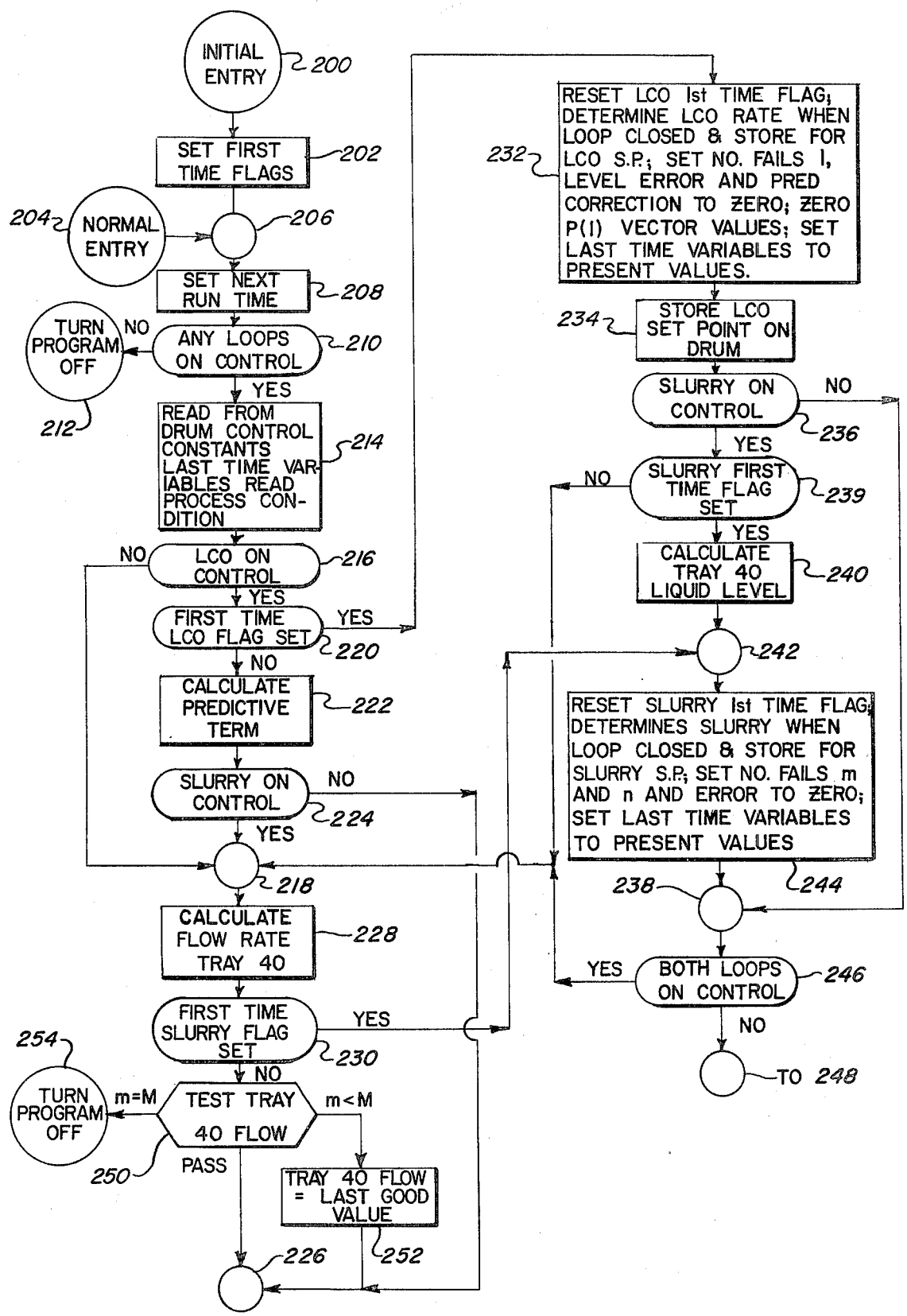
FIGS. 2a and 2b are flow diagrams of a computer program which may be used to implement a portion of a control system of this invention.
Figure 2B:
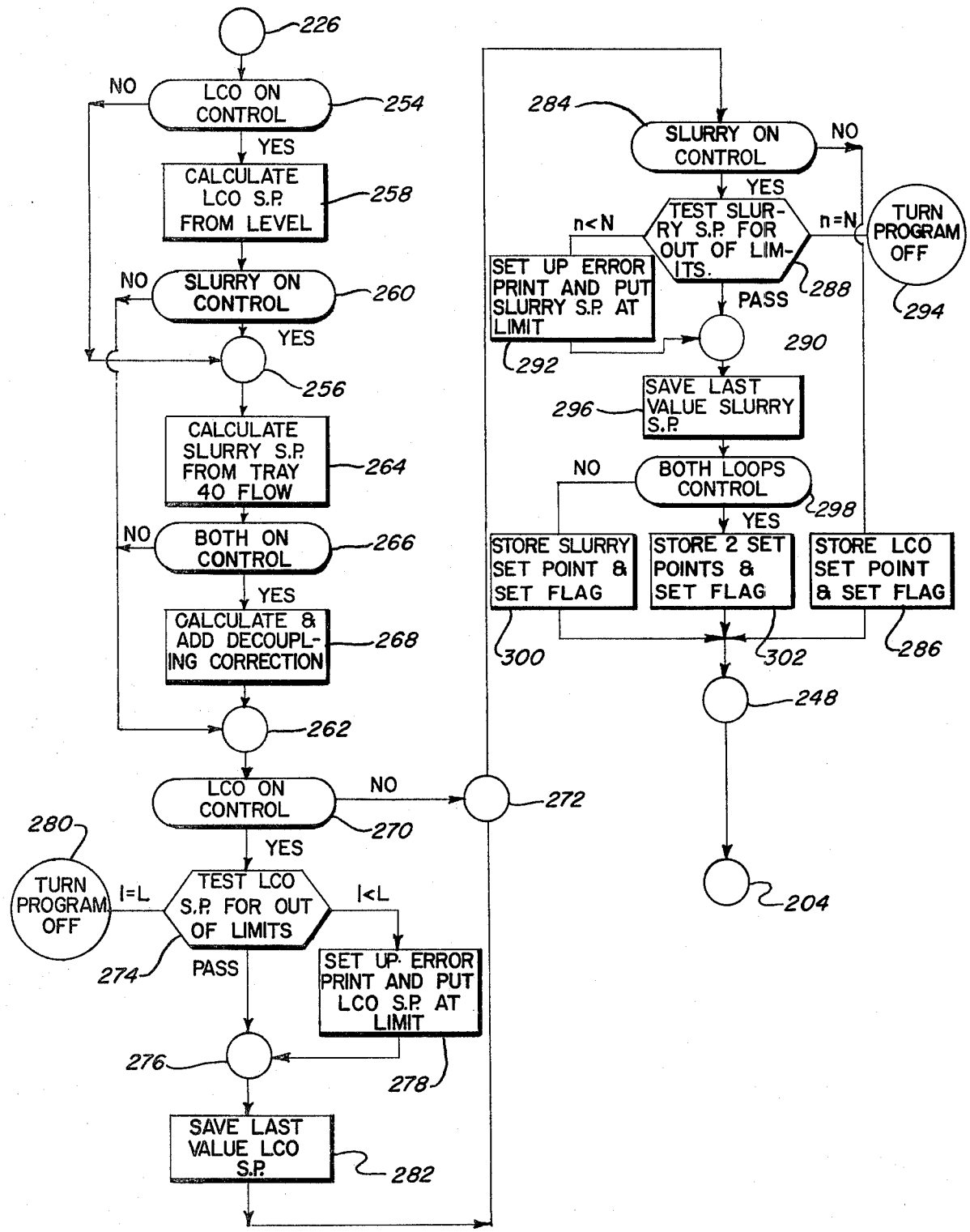

Turning now to FIGS. 2a and 2b, there is there shown a flow chart of a portion of a computer program which may be used with computer network 132 to perform the calculations described above with reference to the control system of FIG. 1. As will be recognized, many types of computers may be used for computer network 132 and those computers may be programmed in many different languages. The program represented by the flow chart of FIGS. 2a and 2b may be used with many such computers and many such programs. Further, programs having flow charts other than that shown in FIGS. 2a and 2b may be used in control systems of this invention, the flow chart of FIGS. 2a and 2b being for purposes of example only.

A program entry box 200 provides for initial starting of the program represented by FIGS. 2a and 2b. It may be controlled by either another program within computer network 132 or by some type of manual entry. Upon operation of entry box 200, two first time flags are set by an operation box 202, the first flag indicating that the light cycle oil draw rate is being controlled by computer network 132, through controller 128, for the first time, and the second indicating that the slurry recycle rate to column 10 is being controlled by computer network 132, through controller 138, for the first time. A program entry box 204 provides for normal entry into the program through an entry box 206. An operation box 208 is operated by entry box 206 and is operative to set the next time at which the program of FIGS. 2a and 2b is to be run. In the previously mentioned application of the control system of this invention, the program is operated at uniformly spaced time intervals and those time intervals are five minutes apart. An alternative box 210 operates to determine whether either the light cycle oil draw rate or the slurry recycle rate is under the control of computer network 132. If neither is, a program entry box 212 terminates the program. If either is, an operation box 214 causes various constants, such as those included in equations (1)–(8) above, and others required for the operation of the program, to be entered into the computer core memory from a drum memory. Additionally, readings are taken from the various condition sensing elements associated with the fractionator 10 as described above and entered into the core memory. Finally, readings from those same condition sensing elements which were taken during the next previous run of the program are also entered into the core memory.

After entry of this information into the core memory, an alternative box 216 checks to see whether the light cycle oil draw rate is under control of computer network 132. If not, the program skips to a program entry box 218. If so, an alternative box 220 checks to see if the light cycle oil first time flag is set. If not, an operation box 222 calculates the predictive term of equation (5). An alternative box 224 then checks to see if the slurry recycle rate is under control of computer network 132. If not, the program skips to a program entry box 226. If so, the program passes through program entry box 218 and an operation box 228 then calculates the liquid flow onto tray 40 in accord with equation (8). Alternative box 230 then checks to see if the slurry recycle first time flag is set.

If either of alternative boxes 220 or 230 indicates a first time flag is set, a side program is entered. If box 220 indicates the light cycle oil first time flag is set, operation box 232 performs a series of steps. First, it resets the light cycle oil first time flag. It then determines what the light cycle oil draw-off rate was when it was initially placed under control of computer network 132. The means for making this determination is not specifically shown, but may be by way of a calculation or reading of the actual value of light cycle oil draw rate taken when that quantity was put under control of the computer network. That determined value is stored and used as the initial set point for controller 128. Box 232 sets the predictive term calculated by box 222 to zero, it sets the fractionator bottom liquid level error read into the memory core to zero, it sets the readings from the fractionator sensing elements taken during the previous run of the program to the present value, it sets all values of the P(I) vector to zero, and for reasons which will subsequently become apparent, it sets the number of fails 1 to zero. Operation box 234 then places the set point for controller 128 as determined by box 232 on the drum memory. A check to see whether the slurry recycle rate is under control of computer network 132 is made by alternative box 236. If not, the side program skips to a program entry box 238 also in the side program. If so, an alternative box 239 checks to determine whether the slurry first time flag is set. If not, the side program returns to the main program through entry box 218. If so, the liquid flow onto tray 40 is calculated by an operation box 240.

Either the affirmative alternative from alternative box 230 or the operation of box 240, through a program entry box 242, causes an operation box 244 to perform a series of operations similar to those of operation box 232. First, it resets the slurry recycle first time flag. It then determines what the slurry recycle rate was when it was initially placed under control of computer network 132. The means for making this determination is not specifically shown, but may be by way of calculation or reading of the actual value of slurry recycle rate taken when that quantity was put under control of the computer network. That determined value is stored and used as the initial set point for controller 128. Box 244 sets the tray 40 liquid flow rate error read into the memory core to zero, it sets the readings from the fractionator sensing elements taken during the previous run of the program to the present value and, for reasons which will subsequently become apparent, it sets two numbers representing the number of fails $m$ and $n$ to zero. Operation box 244, through program entry box 238, then operates an alternative box 246 to determine whether both the light cycle oil draw-off rate and slurry recycle rate are under control of computer network 132. If so, the side program returns to the program at entry box 218. If not, it returns to the program at entry box 248.

Leaving the side program, if the slurry recycle first time flag is not set, a preparation box 250 determines whether the previously computed value of the flow onto tray 40 is reasonable, i.e., whether it is outside a predetermined set of limits or whether the difference between the values calculated during the present and next preceding runs of the program is outside a predetermined set of limits. If the computed value is acceptable according to preparation box 250, the program passes through entry box 226. If the value is unacceptable, and the program has computed an acceptable value within the last M times the program has been run, i.e., m is less than M, an operation box 252 generates an error signal to the person operating the computer and selects the last acceptable value as the one to use for the computed level of flow onto tray 40 and the program also passes through entry box 226. If no acceptable value has been computed within the last M times the program has been run, i.e., $m$ is equal to M, the program is terminated by a program entry block 254. As discussed above, operation box 244 is operative to set the number of previous failures to compute an acceptable value m to zero. Preparation box 250 must also advance $m$ by one each time it determines that an unacceptable value has been calculated by operation box 228, but set $m$ to zero when an acceptable value is calculated. M may be any desired positive integer number.

Turning to FIG. 2b, after program entry box 226, an alternative box 254 determines whether the light cycle oil draw rate is under the control of computer network 132. If not, the program skips to an entry box 256. If so, an operation box 258 calculates the set point for the controller 128 from the measured fractionator bottom liquid level according to equation (1). An alternative box 260 then determines whether the slurry recycle rate is under the control of computer network 132. If not, the program skips to entry box 262. If so, the program passes through entry box 256, and an operation box 264 calculates the set point for controller 138 from the calculated rate of liquid flow onto tray 40 according to equation (2). An alternative box 266 then determines whether both the light cycle oil draw rate and the slurry recycle rate are under the control of computer network 132. If not, the program skips to entry block 262. If so, an operation block 268 calculates the decoupling factors according to equations (5) and (6) and adds them to the set points determined by operation boxes 258 and 264. Operation box 268 also alters the light cycle oil draw rate set point determined by operation block 268 by the predictive term determined by operation block 222.

Following operation block 268, the program passes through entry block 262 to an alternative block 270 which determines whether the light cycle oil draw-off rate is under the control of computer network 132. If not, the program skips to an entry block 272. If so, a preparation box 274 tests the value of the light cycle oil set point calculated by operation block 268 to determine whether it is reasonable, i.e., whether it is outside a predetermined set of limits or whether the difference between the values calculated during the present and next preceding runs of the program is outside a set of predetermined limits. If the calculated value is acceptable, the program passes to an entry box 276. If not, and the program has calculated an acceptable light cycle oil set point within the last L runs of the program, i.e., 1 is less than L, an operation box 278 generates an error signal to the person operating computer network 132 and sets the light cycle oil draw-off rate set point at the value of the violated limit, and the program passes to entry box 276. If not, and the program has failed to calculate an acceptable light cycle oil set point within the last L runs of the program, i.e., 1 is equal to L, a program entry box 280 terminates the operation of the program.

Following entry box 276, the program passes through operation box 282 which saves the last acceptable value of the light cycle oil draw-off rate set point calculated by box 268. The program passes through an entry box 272 to an alternative box 284 which determines whether the slurry recycle rate is under control of the computer network 132. If not, an operation box 286 stores the light cycle oil draw rate set point saved by operation box 282 and sets a flag to indicate to the operator and/or another computer program that a light cycle oil set point has been calculated. If so, a preparation box 288 tests the value of the slurry recycle rate set point calculated by operation block 268 to determine whether it is reasonable, i.e., whether it is outside a predetermined set of limits or whether the difference between the values calculated during the present and next preceding runs of the program is outside a set of predetermined limits. If the calculated value is acceptable, the program passes to an entry box 290. If not, and the program has calculated an acceptable slurry recycle rate set point within the last N runs of the program, i.e., $n$ is less than N, an operation box 292 generates an error signal to the operator and sets the slurry recycle rate set point at the value of the violated limit, and the program passes to entry box 290. If not, and the program has failed to calculate an acceptable light cycle oil draw-off rate set point within the last N runs of the program, i.e., $n$ is equal to N, a program entry box 294 terminates the operation of the program. Preparation boxes 274 and 288, like preparation box 250, must also advance the values of 1 and $n$, respectively, by one each time they determine that an unacceptable value has been calculated for the light cycle oil draw-off rate set point and the slurry recycle rate set point, respectively, and set 1 and $n$, respectively, to zero when an acceptable value is calculated. L and N, like M, may be any desirable integer numbers.

Following entry box 290, the program passes through operation box 296 which saves the last acceptable value of the slurry recycle rate set point. An alternative box 298 then determines whether both the light cycle oil draw-off rate and the slurry recycle rate are under the control of computer network 132. If not, an operation box 300 stores the slurry recycle rate set point saved by operation box 296 and sets a flag to indicate to the operator that a slurry recycle rate set point has been calculated and the program goes to entry box 248. If so, an operation box 302 stores the light cycle oil draw rate and slurry recycle rate set points saved by operation boxes 282 and 296, respectively, and sets a flag to indicate to the operator and/or another computer program that light cycle oil draw-off rate and slurry recycle rate set points have been calculated. The program then passes through entry box 248 and returns to the start of the program through entry box 204 which sets up a delay until the next run time.

The program represented in FIGS. 2a and 2b thus provides a means for implementing the control system of this invention. As is seen, it also includes certain desired operational and safety features. It tests the values calculated for the tray 40 liquid flow and the light cycle oil draw rate and slurry recycle rate set points to determine their reasonableness. If, however, the program has failed to calculate a reasonable value for any one of these quantities within a predetermined number of prior runs of the program, the operation of the program is terminated. If neither the light cycle oil draw rate nor the slurry recycle rate is under the control of computer network 132, the program operation is also terminated. Provisions are also made to initialize the operation of the system when either the light cycle oil draw rate, the slurry recycle rate, or both are initially placed under the control of the computer network 132 and provide for bumpless transfer to the control system resulting in minimal upset to the operation of the fractionator when it is placed under the control of computer network 132. Either the light cycle oil draw rate or the slurry recycle rate may be placed under the control of computer network 132 independently of the other.

It has been found in the operation of the control system of FIGS. 1, 2a and 2b that the output signal of level recorder 140 often contains undesirably high amounts of noise. Thus, it has been found advantageous to associate with the program of FIGS. 2a and 2b a separate program, not shown, which scans and records the outputs of level recorder 140 relatively often for a short period before the commencement of the program of FIGS. 2a and 2b and averages the output of those recorded outputs over that period. The average value is then that used by operation box 258. In the above discussed one application of this invention, the output of recorder 140 was scanned every three seconds for a period of 30 seconds before commencement of the program of FIGS. 2a and 2b.

It may thus be seen that methods and apparatus for controlling the operation of a fractionator have been described which fulfill all of the above mentioned objects. The control system described may be used as a component part of a control system for regulating the operation of an entire refinery operation, or it may be used by itself. The latter usage will be particularly advantageous where the fractionator column under control imposes a limiting condition on the performance of a refining operation.

It will, however, be obvious that many modifications of the specific embodiment shown may be made without departing from the spirit and scope of this invention. For example, the fractionator 10 described above has the input feed conduit located at the bottom of the fractionator and uses a cooler in the path of the slurry or fractionator bottom product recycled to the fractionator. As is well known, many fractionators have an input feed conduit located at positions other than the bottom and use a heater or reboiler in the path of the recycled slurry or fractionator bottom product. This invention is also applicable to fractionators of the latter variety. Further, as has been previously mentioned, a control system including this invention may be implemented using analog computation devices rather than digital devices as described above. Analog devices are particularly useful when some direct measure of the rate of liquid flow to an intermediate tray is available. Such analog devices may be of an electrical, hydraulic, pneumatic, mechanical or other form, or in a combination of these forms. Accordingly, as used in the claims appended hereto, the term "signal" shall be construed to include hydraulic, pneumatic, mechanical, electrical or any other form of signal or signals representative of the value of a predetermined quantity whether in discrete or continuous form. Additionally, in the control system described above, the slurry recycle rate to the fractionator is controlled in accord with the rate of fluid flow onto a tray located at an intermediate position in the fractionator, and the light cycle oil draw-off rate is controlled in accord with the liquid level at the fractionator bottom, with means for reducing the interdependency of the two loops being provided. It is also within the scope of this invention to reverse the control functions, so that the slurry recycle rate to the column is controlled in accord with the liquid level at the fractionator bottom and the light cycle oil draw-off rate is controlled in accord with the rate of fluid flow onto a tray located at an intermediate position in the fractionator.

While a particular embodiment of this invention is shown above, it will be understood, of course, that the invention is not to be limited thereto, since many modifications may be made. It is contemplated, therefore, by the appended claims, to cover any such modifications as fall within the true spirit and scope of this invention.

We claim:

1. The method of controlling the operation of a petroleum fractionator including a plurality of vertically disposed trays and comprising the steps of:
generating a first signal responsive to the rate of liquid flow onto a first of said trays located at a first intermediate position in said fractionator;
generating a second signal responsive to the liquid level at the bottom of said fractionator;
controlling the rate at which a bottom product of said fractionator is recycled through a heat transfer apparatus to said fractionator in response to said first signal;
controlling the rate at which fluid is withdrawn from said fractionator from a second of said trays located at a second intermediate position in said fractionator in response to said second signal; and
further controlling the rate at which the bottom product of said fractionator is recycled to said fractionator through said heat transfer apparatus in response to said second signal and the rate at which fluid is withdrawn from said second tray in response to said first signal to reduce the interaction between said controlling steps.

2. The method of claim 1 further comprising the steps of generating a plurality of third signals responsive to the rates of fluid withdrawal from said second tray corresponding to the rates at which feed is supplied to said fractionator at a plurality of preceding times, combining said third signals to form a fourth signal responsive to said fluid withdrawal rates, combining said second and fourth signals to form a fifth signal responsive to said second and fourth signals, and controlling the rate at which fluid is withdrawn from said second tray in response to said fifth signal.

3. Apparatus for controlling the operation of a petroleum fractionator, said fractionator comprising a plurality of vertically disposed trays, and comprising:
first means for generating at an output a first signal responsive to the rate of liquid flow onto a first of said trays located at a first intermediate position in said fractionator;
second means for generating at an output a second signal responsive to the liquid level at the bottom of said fractionator;
third means for controlling the rate at which a bottom product of said fractionator is recycled to said fractionator through a heat transfer apparatus in response to the signal present at an input of said third means, said input of said third means being coupled to said output of said first means to form a first control loop;
fourth means for controlling the rate at which fluid is withdrawn from said fractionator from a second of said trays located at a second intermediate position in said fractionator in response to the signal present at an input of said fourth means, said input of said fourth means being coupled to said output of said second means to form a second control loop; and
fifth means for coupling the output of said first means to the input of said fourth means and coupling the output of said second means to the input of said third means and causing the operation of said first control loop to be responsive to said second signal and causing the operation of said second control loop to be responsive to said first signal and effecting a reduction in the interaction between said first and second control loops.

4. The apparatus of claim 3 further comprising means for generating a first plurality of signals responsive to the rates at which feed is supplied to said fractionator at a plurality of preceding times, means for generating a second plurality of signals responsive to the steady state rates at which fluid is withdrawn from said second tray corresponding to said feed rates, means for generating a third signal responsive to said second plurality of signals, and means for coupling said third signal to said second control loop and causing the operation of said second control loop to be responsive to said third signal.

* * * * *